(12) United States Patent
Mochida et al.

(10) Patent No.: US 8,995,984 B2
(45) Date of Patent: Mar. 31, 2015

(54) COMMUNICATION SYSTEM, COMPACT BASE STATION, AND COMMUNICATION METHOD

(75) Inventors: Eiji Mochida, Osaka (JP); Hirotsugu Yamamoto, Osaka (JP); Kenichi Murakami, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 330 days.

(21) Appl. No.: 13/505,522

(22) PCT Filed: Oct. 29, 2010

(86) PCT No.: PCT/JP2010/069339
§ 371 (c)(1),
(2), (4) Date: May 23, 2012

(87) PCT Pub. No.: WO2011/055696
PCT Pub. Date: May 12, 2011

(65) Prior Publication Data
US 2012/0225646 A1    Sep. 6, 2012

(30) Foreign Application Priority Data

Nov. 6, 2009    (JP) .................................. 2009-255326

(51) Int. Cl.
*H04W 4/00*    (2009.01)
*H04W 92/20*    (2009.01)
(Continued)

(52) U.S. Cl.
CPC ................ *H04W 92/20* (2013.01); *H04W 4/20* (2013.01); *H04W 84/042* (2013.01); *H04W 72/04* (2013.01); *H04W 36/0055* (2013.01); *H04W 84/045* (2013.01)
USPC ........ 455/422.1; 455/436; 455/448; 455/449; 455/450; 370/328; 370/329; 370/401

(58) Field of Classification Search
CPC ....... H04W 72/04; H04W 4/20; H04W 76/02; H04W 76/041; H04W 4/042; H04W 84/045; H04W 92/20; H04W 84/04; H04W 84/042
USPC .............. 455/436–449, 524, 515, 422.1, 450, 455/509; 370/328, 329, 401
See application file for complete search history.

(56) References Cited

U.S. PATENT DOCUMENTS 8,155,647 B2 *    4/2012    Israelsson et al. ............ 455/434
8,385,928 B2 *    2/2013    Whinnett ...................... 455/449
(Continued)

FOREIGN PATENT DOCUMENTS

JP    2004-15103    1/2004
JP    2008-193526    8/2008
(Continued)

OTHER PUBLICATIONS

Motorola, "HeNB Interference Coordination," 3GPP TSG-RAN WG1 Meeting #59, R1-094839, Jeju, South Korea, Nov. 8-14, 2009.
(Continued)

*Primary Examiner* — Olumide T Ajibade Akonai
(74) *Attorney, Agent, or Firm* — Drinker Biddle & Reath LLP

(57) ABSTRACT

A communication system (1) includes a mobile communication network (2); a fixed communication network (3) connected to the mobile communication network (2); and a plurality of radio base stations capable of communicating with a mobile terminal (100) by radio communication. The radio base stations include a first base station (41, 42) connected to the mobile communication network (2); and second base stations (51, 52) connected to the fixed communication network (3) through wire communication lines (61, 62). A communication connection using a predetermined interface is established between one of the second base stations (51) and one of neighboring base stations (the first base station (42) and another one of the second base stations (52)) located in the neighborhood of the one of the second base stations (51).

16 Claims, 10 Drawing Sheets

(51) Int. Cl.
*H04W 84/04* (2009.01)
*H04W 4/20* (2009.01)
*H04W 72/04* (2009.01)
*H04W 36/00* (2009.01)

(56) References Cited

U.S. PATENT DOCUMENTS

| 8,649,323 | B2* | 2/2014 | Iwamura et al. | 370/328 |
| 2009/0196253 | A1* | 8/2009 | Semper | 370/331 |
| 2009/0264077 | A1* | 10/2009 | Damnjanovic | 455/63.1 |
| 2009/0270107 | A1* | 10/2009 | Lee et al. | 455/450 |
| 2009/0298475 | A1* | 12/2009 | Czaja et al. | 455/412.2 |

FOREIGN PATENT DOCUMENTS

| JP | 2008-278263 | 11/2008 |
| JP | 2009-44336 | 2/2009 |
| JP | 2009-200644 | 9/2009 |
| WO | 2009/023746 | 2/2009 |
| WO | WO 2009/044620 A1 | 4/2009 |
| WO | 2009/120127 | 10/2009 |

OTHER PUBLICATIONS

3GPP TSG-RAN WG1 #59 R1-094778, Downlink Interference Coordination Assisted by Network between Home eNodeB and Macro eNodeB for LTE-Advanced, Kyocera, Nov. 2, 2009.

3GPP TSG RAN WG3 Meeting #59 R3-080465, Impact on S1AP from HeNB GW concept, Nokia Siemens Networks, Mitsubishi Electric, Feb. 18, 2008.

3GPP TSG-RAN WG3 Meeting #57bis R3-071852, Connection establishment for HNB CSG, Samsung, Oct. 3, 2007.

* cited by examiner

COMMUNICATION SYSTEM, COMPACT BASE STATION, AND COMMUNICATION METHOD

TECHNICAL FIELD

The present invention relates to a communication system, a compact base station, and a communication method.

BACKGROUND ART

Communications by mobile phones use radio waves. Thus, even within a communication coverage area, in a radio shadow area where radio waves from an outdoor base station (hereinafter, referred to as a "macrocell base station") are difficult to reach (or do not reach), communications by mobile phones cannot be performed. Hence, in order to enable communications by mobile phones even in the radio shadow area, the construction of a communication system using a compact base station is considered.

In this communication system, a compact base station (hereinafter, referred to as a "femtocell base station") having, as its coverage area, a very small cell (femtocell) with a radius of the order of several meters to several tens of meters is installed in a radio shadow area. In addition, the femtocell base station is connected to a mobile communication network of a mobile service provider through a wire communication line. Therefore, mobile phones in the radio shadow area are connected to the mobile communication network through the femtocell base station and the wire communication line. As a result, even in the radio shadow area, communications by mobile phones are enabled.

Note that Japanese Unexamined Patent Publication No. 2004-15103 (Patent Literature 1) discloses a communication system including a radio base station installed in an optical communication subscriber's home. In this communication system, a signal from a mobile phone used in the subscriber's home is transmitted from the radio base station in the home to a local office through an optical communication cable and is then transmitted from the local office to various networks such as an IP network, a general telephone switching network, and a mobile communication switching network.

CITATION LIST

[Patent Literature]

Patent Literature 1: Japanese Unexamined Patent Publication No. 2004-15103

SUMMARY OF INVENTION

Technical Problem

In LTE (Long Term Evolution), a communication connection using a base station-to-base station logical interface, referred to as an X2 interface, is established between adjacent macrocell base stations (eNodeBs). The adjacent macrocell base stations communicate information about a used frequency band, information about the movement operation of a mobile terminal, etc., with each other via the X2 interface. This suppresses radio wave interference between the adjacent macrocells and achieves rapid inter-cell movement.

Here, the "movement" of a mobile terminal not only refers to a handover but also refers to making a selection of which base station is used to perform communication when a mobile terminal in an idle state starts communication from now on, i.e., when the mobile terminal starts a call or data communication.

However, for a femtocell base station (Home eNodeB), a communication connection using an X2 interface is not established with a macrocell base station located in the neighborhood thereof or with another femtocell base station located in the neighborhood thereof. Therefore, since the base stations cannot communicate information about a used frequency band with each other via the X2 interface, when the used frequency band overlaps between adjacent cells, radio wave interference between the adjacent cells increases. In addition, since the base stations cannot communicate information about movement operation with each other via the X2 interface, it is difficult to perform rapid inter-cell movement.

The present invention is made in view of such circumstances, and an object thereof is to obtain a communication system, a compact base station, and a communication method that are capable of suppressing radio wave interference between adjacent cells and capable of achieving rapid inter-cell movement even in femtocell base stations.

SOLUTION TO PROBLEM

A communication system according to a first aspect of the present invention includes: a mobile communication network; a fixed communication network connected to the mobile communication network; and a plurality of radio base stations capable of communicating with a mobile terminal by radio communication, and the radio base stations include: a first base station connected to the mobile communication network; and second base stations connected to the fixed communication network through wire communication lines, and a communication connection using a predetermined logical interface is established between one of the second base stations and a neighboring base station located in a neighborhood of the one of the second base stations, the neighboring base station including the first base station and/or another one of the second base stations.

According to the communication system according to the first aspect, a communication connection using a predetermined logical interface is established between a second base station and its neighboring base station. Therefore, since the second base station and its neighboring base station can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed. In addition, since the second base station and its neighboring base station can communicate information about movement operation with each other via the logical interface, inter-cell movement can be performed rapidly.

A communication system according to a second aspect of the present invention is such that in the communication system according to the first aspect, particularly, a base station-to-base station logical interface is used as the predetermined logical interface.

Here, the "base station-to-base station logical interface" includes an X2 interface in LTE.

According to the communication system according to the second aspect, since the second base station and its neighboring base station can be logically and directly connected to each other using the base station-to-base station logical interface, communication of information can be performed between the second base station and its neighboring base station without adding a change to communication management apparatuses such as MMEs.

A communication system according to a third aspect of the present invention is such that in the communication system according to the second aspect, particularly, each of the second base stations: makes a search for a neighboring base station; makes a request to a neighboring base station having responded to the search, for establishment of the communication connection; and establishes the communication connection with the neighboring base station having responded to the request.

According to the communication system according to the third aspect, a second base station makes a search for its neighboring base station, makes a request to a neighboring base station having responded to the search, for establishment of a communication connection, and establishes a communication connection with the neighboring base station having responded to the request. By the second base station making a search for its neighboring base station itself, there is no need to prepare a management server holding the location information of radio base stations, making it possible to achieve simplification of the configuration of the communication system. In addition, upon requesting establishment of a communication connection, the setting information, etc., of the second base station can be notified from the second base station to the neighboring base station, and upon responding to the request, the setting information, etc., of the neighboring base station can be notified from the neighboring base station to the second base station. By the base stations notifying each other of the setting information, a communication connection can be securely established.

A communication system according to a fourth aspect of the present invention is such that the communication system according to the second aspect particularly further includes: a management server that holds location information of the radio base stations, and each of the second base stations: obtains information about the neighboring base station from the management server; makes a request to the neighboring base station about which the information is obtained from the management server, for establishment of the communication connection; and establishes the communication connection with the neighboring base station having responded to the request.

According to the communication system according to the fourth aspect, a second base station obtains information about its neighboring base station from the management server, makes a request to the neighboring base station about which the information is obtained from the management server, for establishment of a communication connection, and establishes a communication connection with the neighboring base station having responded to the request. By the management server collectively managing the location information of radio base stations, a neighboring base station of the second base station can be accurately identified based on the location information. In addition, upon requesting establishment of a communication connection, the setting information, etc., of the second base station can be notified from the second base station to the neighboring base station, and upon responding to the request, the setting information, etc., of the neighboring base station can be notified from the neighboring base station to the second base station. By the base stations notifying each other of the setting information, a communication connection can be securely established.

A communication system according to a fifth aspect of the present invention is such that in the communication system according to the first aspect, particularly, a base station-to-base station logical interface using a base station-to-upper node logical interface is used as the predetermined logical interface.

Here, the "base station-to-upper node logical interface" includes an S1 interface in LTE. In addition, the "base station-to-base station logical interface" includes an X2 interface in LTE.

According to the communication system according to the fifth aspect, by allowing the base station-to-base station logical interface to be tunneled over the base station-to-upper node logical interface, a second base station and its neighboring base station can be logically connected to each other. As a result, without adding a new port for establishing the base station-to-base station logical interface besides the base station-to-upper node logical interface, the second base station and its neighboring base station can be logically connected to each other.

A communication system according to a sixth aspect of the present invention is such that the communication system according to the fifth aspect, particularly, further includes a communication management apparatus that is connected to each of the second base stations using the base station-to-upper node logical interface and collects information about the neighboring base station.

According to the communication system according to the sixth aspect, by the communication management apparatus, information about a neighboring base station of a second base station can be collected from another communication management apparatus, etc. By the communication management apparatus collecting information about a neighboring base station, there is no need to prepare a management server holding the location information of radio base stations, making it possible to achieve simplification of the configuration of the communication system.

A communication system according to a seventh aspect of the present invention is such that in the communication system according to the sixth aspect, particularly, each of the second base stations: obtains information about a neighboring base station from the communication management apparatus; makes a request through the communication management apparatus to the neighboring base station about which the information is obtained from the communication management apparatus, for establishment of the communication connection; and establishes the communication connection with the neighboring base station having responded to the request.

According to the communication system according to the seventh aspect, upon requesting establishment of a communication connection, the setting information, etc., of a second base station can be notified from the second base station to its neighboring base station, and upon responding to the request, the setting information, etc., of the neighboring base station can be notified from the neighboring base station to the second base station. By the base stations notifying each other of the setting information, a communication connection can be securely established.

A compact base station according to an eighth aspect of the present invention is used for a communication system including a mobile communication network; a fixed communication network connected to the mobile communication network; and a plurality of radio base stations capable of communicating with a mobile terminal by radio communication, and the radio base stations include: a first base station connected to the mobile communication network; and second base stations connected to the fixed communication network through wire communication lines, each of the second base stations serving as the compact base station, and a communication connection using a predetermined logical interface is established between one of the second base stations and a neighboring base station located in a neighborhood of the second base stations, the neighboring base station including the first base station and/or another one of the second base stations.

According to the compact base station according to the eighth aspect, a communication connection using a predetermined logical interface is established between a second base station and its neighboring base station. Therefore, since the second base station and its neighboring base station can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed. In addition, since the second base station and its neighboring base station can communicate information about movement operation with each other via the logical interface, inter-cell movement can be performed rapidly.

A communication method according to a ninth aspect of the present invention is for a communication system including a mobile communication network; a fixed communication network connected to the mobile communication network; and a plurality of radio base stations capable of communicating with a mobile terminal by radio communication, and the radio base stations include: a first base station connected to the mobile communication network; and second base stations connected to the fixed communication network through wire communication lines, a communication connection using a predetermined logical interface is established between one of the second base stations and a neighboring base station located in a neighborhood of the second base stations, the neighboring base station including the first base station and/or another one of the second base stations, and the one of the second base stations performs communication with the neighboring base station through the communication connection.

According to the communication method according to the ninth aspect, a communication connection using a predetermined logical interface is established between a second base station and its neighboring base station. Therefore, since the second base station and its neighboring base station can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed. In addition, since the second base station and its neighboring base station can communicate information about movement operation with each other via the logical interface, inter-cell movement can be performed rapidly.

A communication system according to a tenth aspect of the present invention is such that the communication system according to the second aspect, particularly, further includes a relay apparatus connected between the mobile communication network and the fixed communication network, and the second base stations are connected to the mobile communication network through the fixed communication network and the relay apparatus, and when a communication connection using the base station-to-base station logical interface is established between the relay apparatus and the first base station, the relay apparatus and the second base stations use the base station-to-base station logical interface using the base station-to-upper node logical interface, between the relay apparatus and the second base stations.

According to the communication system according to the tenth aspect of the present invention, by using a base station-to-base station logical interface using a base station-to-upper node logical interface between the relay apparatus and a second base station, the communication system can be configured as if a communication connection using a base station-to-base station logical interface is established between a first base station and the second base station. By this, a communication connection using a base station-to-base station logical interface can be established in a pseudo-manner between the first base station, the relay apparatus, and the second base station.

A communication system according to an eleventh aspect of the present invention includes: a plurality of radio base stations, each capable of communicating with a mobile terminal by radio communication and capable of establishing a communication connection using a predetermined logical interface with another radio base station; and a communication control apparatus capable of storing information on the plurality of radio base stations and capable of communicating with the plurality of radio base stations, and when the communication control apparatus recognizes a target base station being one of the radio base stations to newly establish the communication connection with another one of the radio base stations, the communication control apparatus notifies all those radio base stations other than the target base station of a connection establishment instruction indicating an instruction to perform a connection establishment process for establishing the communication connection with the target base station, and after each of the radio base stations is notified of the connection establishment instruction from the communication control apparatus and thereby performs the connection establishment process, each of the radio base stations determines whether or not to maintain an establishment state of the communication connection with the target base station and if determined not to maintain the establishment state, then the radio base station disconnects the communication connection.

According to the communication system according to the eleventh aspect of the present invention, for example, when a radio base station is newly installed and a communication connection using a predetermined logical interface is established between the radio base station and another radio base station, there is no need for a human to manually perform the establishment process and thus time and trouble and cost can be reduced. In addition, without providing radio base stations with greater functionality, a process of establishing a communication connection using a predetermined logical interface can be performed with a simple process and configuration. Furthermore, by disconnecting a predetermined logical interface that does not need to be maintained, wasteful use of various resources can be prevented in the communication system.

A communication system according to a twelfth aspect of the present invention is such that in the communication system according to the eleventh aspect, particularly, the target base station is connected to a mobile communication network through a fixed communication network, and the communication control apparatus notifies all those radio base stations other than the target base station of the connection establishment instruction.

According to the communication system according to the twelfth aspect of the present invention, a process of selecting a radio base station serving as the destination of notification of a connection establishment instruction is not necessary, making it possible to achieve simplification of a process of notifying of a connection establishment instruction.

A communication system according to a thirteenth aspect of the present invention is such that in the communication system according to the eleventh aspect, particularly, the target base station is connected to a mobile communication network through a fixed communication network, and the communication control apparatus notifies the radio base station disposed in a neighborhood of the target base station among the radio base stations, of the connection establishment instruction.

According to the communication system according to the thirteenth aspect of the present invention, by a configuration in which a connection establishment instruction is notified only to a radio base station disposed in the neighborhood of a target base station, a process of establishing a communication connection using a predetermined logical interface can be more efficiently performed.

A communication system according to a fourteenth aspect of the present invention is such that in the communication system according to any one of the eleventh to thirteenth aspects, particularly, each of the radio base stations determines not to maintain the establishment state of the communication connection when, after the radio base station is notified of the connection establishment instruction from the communication control apparatus and thereby performs the connection establishment process, the predetermined logical interface established with the target base station has not been used for a predetermined period.

According to the communication system according to the fourteenth aspect of the present invention, whether or not to maintain a predetermined logical interface can be appropriately determined.

In addition, each of the radio base stations determines not to maintain the establishment state of the communication connection when, after the radio base station is notified of the connection establishment instruction from the communication control apparatus and thereby performs the connection establishment process, the amount of data transmitted and received during a predetermined period, using the predetermined logical interface established with the target base station is less than or equal to a predetermined value.

In addition, each of the radio base stations determines not to maintain the establishment state of the communication connection when, after the radio base station is notified of the connection establishment instruction from the communication control apparatus and thereby performs the connection establishment process, the radio base station transmits predetermined data to the target base station and the response time of the target base station to the predetermined data is greater than or equal to a predetermined value.

A communication system according to a fifteenth aspect of the present invention includes: a plurality of radio base stations, each capable of communicating with a mobile terminal by radio communication and capable of establishing a communication connection using a predetermined logical interface with another radio base station; and a communication control apparatus capable of storing information on the plurality of radio base stations and capable of communicating with the plurality of radio base stations, and when the communication control apparatus recognizes a target base station being one of the radio base stations to newly establish the communication connection with another one of the radio base stations, the communication control apparatus notifies a radio base station disposed in a neighborhood of the target base station among the radio base stations, of a connection establishment instruction indicating an instruction to perform a connection establishment process for establishing the communication connection with the target base station.

According to the communication system according to the fifteenth aspect of the present invention, by a configuration in which a connection establishment instruction is notified only to a radio base station disposed in the neighborhood of a target base station, a process of establishing a communication connection using a predetermined logical interface can be more efficiently performed.

A communication system according to a sixteenth aspect of the present invention is such that in the communication system according to the thirteenth or fifteenth aspect, particularly, the communication control apparatus selects the radio base station to be notified of the connection establishment instruction from among the radio base stations, based on information indicating installed locations of the plurality of radio base stations including the target base station.

According to the communication system according to the sixteenth aspect of the present invention, by a configuration using information indicating the installed locations of radio base stations, a radio base station to be notified of a connection establishment instruction can be appropriately selected.

A communication system according to a seventeenth aspect of the present invention is such that in the communication system according to any one of the first to seventh and tenth to sixteenth aspects, particularly, at least one of information for performing, by the mobile terminal, movement operation between the radio base stations, information indicating interference received by the radio base stations, and load information of the radio base stations is transmitted and received between the radio base stations via the predetermined logical interface.

According to the communication system according to the seventeenth aspect of the present invention, radio wave interference between adjacent femtocells is suppressed and rapid and appropriate inter-cell movement can be achieved.

A communication control apparatus according to an eighteenth aspect of the present invention is capable of storing information on a plurality of radio base stations, each capable of establishing a communication connection using a predetermined logical interface with another radio base station, and is capable of communicating with the plurality of radio base stations, and when the communication control apparatus recognizes a target base station being one of the radio base stations to newly establish the communication connection with another one of the radio base stations, the communication control apparatus notifies the plurality of radio base stations other than the target base station of a connection establishment instruction indicating an instruction to perform a connection establishment process for establishing the communication connection with the target base station, and after each of the radio base stations performs the connection establishment process in response to the connection establishment instruction, the communication control apparatus determines whether or not to maintain an establishment state of the communication connection between each of the radio base stations and the target base station, and if determined not to maintain the establishment state, then the communication control apparatus performs control to disconnect the communication connection.

According to the communication control apparatus according to the eighteenth aspect of the present invention, for example, when a radio base station is newly installed and a communication connection using a predetermined logical interface is established between the radio base station and another radio base station, there is no need for a human to manually perform the establishment process and thus time and trouble and cost can be reduced. In addition, without providing radio base stations with greater functionality, a process of establishing a communication connection using a predetermined logical interface can be performed with a simple process and configuration. Furthermore, by disconnecting a predetermined logical interface that does not need to be maintained, wasteful use of various resources can be prevented in the communication system.

A communication method according to a nineteenth aspect of the present invention is for a communication system including a plurality of radio base stations, each capable of communicating with a mobile terminal by radio communication and capable of establishing a communication connection using a predetermined logical interface with another radio base station; and a communication control apparatus capable of storing information on the plurality of radio base stations and capable of communicating with the plurality of radio base stations, the communication method comprising the steps of; when the communication control apparatus recognizes a target base station being one of the radio base stations to newly establish the communication connection with another one of the radio base stations, notifying the plurality of radio base stations other than the target base station of a connection establishment instruction indicating an instruction to perform a connection establishment process for establishing the communication connection with the target base station, and after each of the radio base stations is notified of the connection establishment instruction from the communication control apparatus and thereby performs the connection establishment process, determining whether or not to maintain an establishment state of the communication connection with the target base station and disconnecting the communication connection if determined not to maintain the establishment state.

According to the communication method according to the nineteenth aspect of the present invention, for example, when a radio base station is newly installed and a communication connection using a predetermined logical interface is established between the radio base station and another radio base station, there is no need for a human to manually perform the establishment process and thus time and trouble and cost can be reduced. In addition, without providing radio base stations with greater functionality, a process of establishing a communication connection using a predetermined logical interface can be performed with a simple process and configuration. Furthermore, by disconnecting a predetermined logical interface that does not need to be maintained, wasteful use of various resources can be prevented in the communication system.

ADVANTAGEOUS EFFECTS OF INVENTION

According to the present invention, even in femtocell base stations, radio wave interference between adjacent cells can be suppressed and rapid inter-cell movement can be achieved.

DESCRIPTION OF EMBODIMENTS

Embodiments of the present invention will be described in detail below using the drawings. Note that those components denoted by the same reference signs in different drawings indicate the same or corresponding components.

<First Embodiment>

Figure 1:
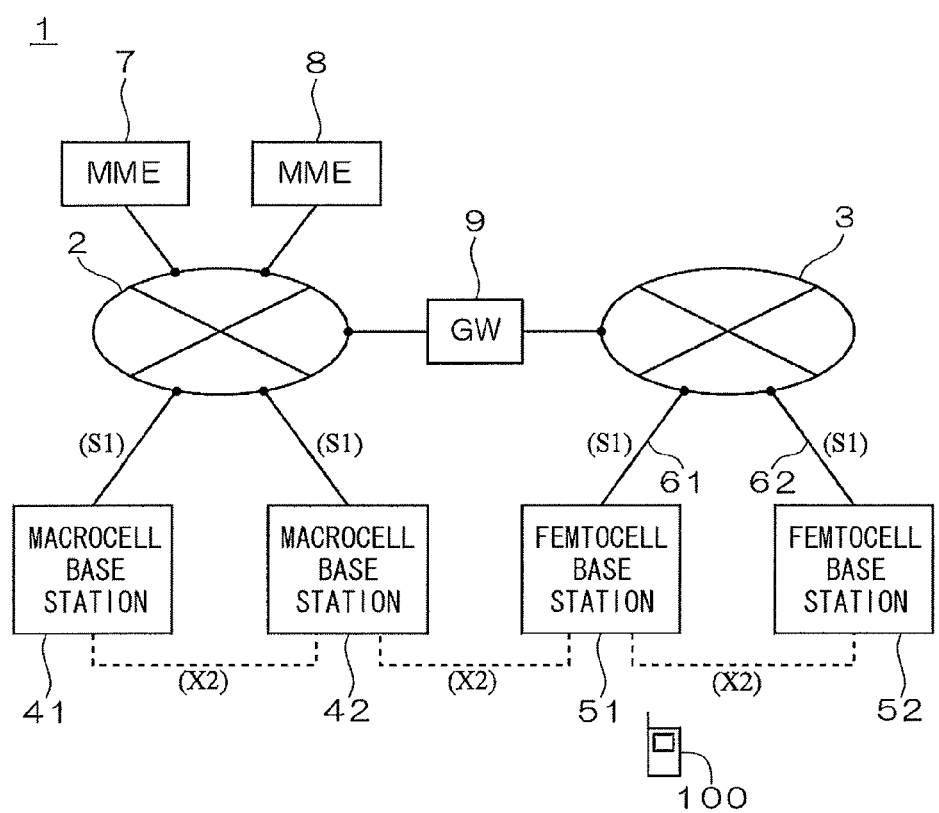
FIG. 1 is a diagram showing an overall configuration of a communication system according to a first embodiment of the present invention.

FIG. 1 is a diagram showing an overall configuration of a communication system 1 according to a first embodiment of the present invention. Macrocell base stations (eNodeBs) 41 and 42 are connected to a mobile communication network 2. Femtocell base stations (Home eNodeBs) 51 and 52 are connected to a fixed communication network 3 through wire communication lines 61 and 62 such as optical fibers. The fixed communication network 3 is connected to the mobile communication network 2 through a gateway 9. An MME (Mobility Management Entity) 7 serving as an upper node of the macrocell base stations 41 and 42 is connected to the mobile communication network 2. In addition, an MME 8 serving as an upper node of the femtocell base stations 51 and 52 is connected to the mobile communication network 2. The MME 7 functions as a communication management apparatus for communication performed through the macrocell base stations 41 and 42, and performs various processes such as session setting and release and control of movement operation. Likewise, the MME 8 functions as a communication management apparatus for communication performed through the femtocell base stations 51 and 52, and performs various processes such as session setting and release and control of movement operation.

The macrocell base stations 41 and 42 each are logically connected to the MME 7 via a base station-to-upper node logical interface (S1 interface in LTE (Long Term Evolution)). Likewise, the femtocell base stations 51 and 52 each are logically connected to the MME 8 via a base station-to-upper node logical interface (S1 interface). In addition, the macrocell base stations 41 and 42 are logically connected to each other via a base station-to-base station logical interface (X2 interface in LTE).

In the following example, it is assumed that the macrocell base station 42 and the femtocell base station 52 are neighboring base stations of the femtocell base station 51. That is, a situation is assumed in which radio waves to be transmitted and received to/by the macrocell base station 42 and the femtocell base station 52 may interfere with radio waves to be transmitted and received to/by the femtocell base station 51 because a femtocell that is a coverage area of the femtocell base station 51, a macrocell that is a coverage area of the macrocell base station 42, and a femtocell that is a coverage area of the femtocell base station 52 overlap with each other or are close to each other. In addition, in this situation, when a mobile terminal 100, such as a mobile phone, communicating with the femtocell base station 51 has moved, the macrocell of the macrocell base station 42 and the femtocell of the femtocell base station 52 may become a target of a handover from the femtocell of the femtocell base station 51.

As shown in FIG. 1, the femtocell base station 51 is logically connected to the macrocell base station 42 and the femtocell base station 52 which are neighboring base stations, via base station-to-base station logical interfaces (X2 interfaces). That is, communication connections using the X2 interfaces are established between the femtocell base station 51 and each of the neighboring base stations.

Figure 2:
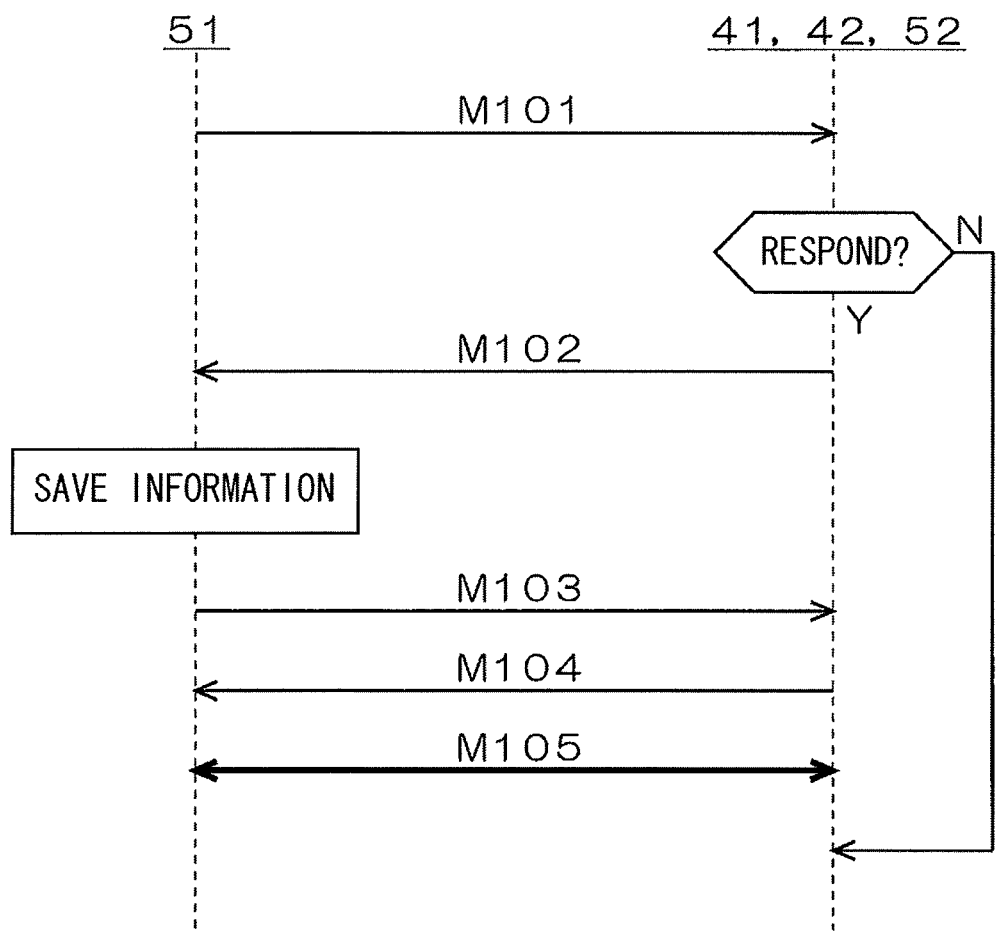
FIG. 2 is a diagram showing a process sequence for establishing communication connections when a femtocell base station is newly installed.

FIG. 2 is a diagram showing a process sequence for establishing communication connections when the femtocell base station 51 is newly installed. When the femtocell base station 51 is connected to the fixed communication network 3, first, the femtocell base station 51 makes a search for its neighboring base stations. Specifically, the femtocell base station 51 broadcasts, by radio, a search signal M101 requesting a response when the intensity of a received radio wave is greater than or equal to a predetermined threshold value, together with self identification information such as a base station ID, to an area around the femtocell base station 51. The search signal M101 is received by the macrocell base stations 41 and 42 and the femtocell base station 52.

Then, the macrocell base stations 41 and 42 and the femtocell base station 52 each measure the intensity of a received radio wave for the search signal M101 and determine whether or not a response to the femtocell base station 51 is required. In the example of the present embodiment, the intensity of a received radio wave for the search signal M101 received by each of the macrocell base station 42 and the femtocell base station 52 which are neighboring base stations is greater than or equal to the threshold value, and the intensity of a received radio wave for the search signal M101 received by the macrocell base station 41 which is not a neighboring base station is less than the threshold value. Therefore, the macrocell base station 42 and the femtocell base station 52 each return a response signal M102 indicating the reception of the search signal M101, together with self identification information such as a base station ID, to the femtocell base station 51. Returning of the response signals M102 may be performed by either wire communication or radio communication. The macrocell base station 41, on the other hand, does not return a response signal M102 to the femtocell base station 51.

Then, the femtocell base station 51 saves the information received from the macrocell base station 42 and the femtocell base station 52 and thereafter transmits a request signal M103 requesting establishment of a communication connection, together with self setting information such as a port number used for an X2 interface and location information, to the macrocell base station 42 and the femtocell base station 52. Transmission of the request signal M103 may be performed by either wire communication or radio communication.

Then, the macrocell base station 42 and the femtocell base station 52 having received the request signals M103 each return a response signal M104 to the request for establishment of a communication connection, together with self setting information such as a port number used for the X2 interface and location information, to the femtocell base station 51. Returning of the response signals M104 may be performed by either wire communication or radio communication.

Then, by the macrocell base station 42 and the femtocell base stations 51 and 52 completing a process for port setting, etc., a communication connection using the X2 interface is established between the femtocell base station 51 and the macrocell base station 42 and between the femtocell base station 51 and the femtocell base station 52. The communication connections may be either wired or radio ones. Thereafter, the femtocell base station 51 and the macrocell base station 42 and the femtocell base station 52 communicate self setting information M105 such as a frequency band to be used, with each other through the communication connections. In addition, when there arises the need for movement operation of the mobile terminal 100, the base stations communicate information about the movement operation with each other through the communication connections.

As such, according to the communication system 1 according to the present embodiment, communication connections using a predetermined logical interface are established between the femtocell base station 51 and each of its neighboring base stations (the macrocell base station 42 and the femtocell base station 52). Therefore, since the femtocell base station 51 and its neighboring base stations can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed. In addition, since the femtocell base station 51 and its neighboring base stations can communicate information about movement operation with each other via the logical interface, intercell movement can be performed rapidly compared to the case in which the information is communicated via the MMEs 7 and 8, etc.

In addition, according to the communication system 1 according to the present embodiment, since the femtocell base station 51 and its neighboring base stations can be logically and directly connected to each other using an X2 interface, communication of information can be performed between the femtocell base station 51 and each of its neighboring base stations without adding a change to communication management apparatuses such as the MMEs 7 and 8.

In addition, according to the communication system 1 of the present embodiment, the femtocell base station 51 makes a search for its neighboring base stations, makes a request to neighboring base stations having responded to the search, for establishment of a communication connection, and establishes communication connections with the neighboring base stations having responded to the request. By the femtocell base station 51 making a search for its neighboring base stations itself, there is no need to prepare a management server 10 (see FIG. 3) holding the location information of radio base stations, making it possible to achieve simplification of the configuration of the communication system 1. In addition, upon requesting establishment of a communication connection, the setting information, etc., of the femtocell base station 51 can be notified from the femtocell base station 51 to its neighboring base stations, and upon responding to the request, the setting information, etc., of the neighboring base stations can be notified from the neighboring base stations to the femtocell base station 51. By the base stations notifying each other of the setting information, communication connections can be securely established.

<Second Embodiment>

Figure 3:
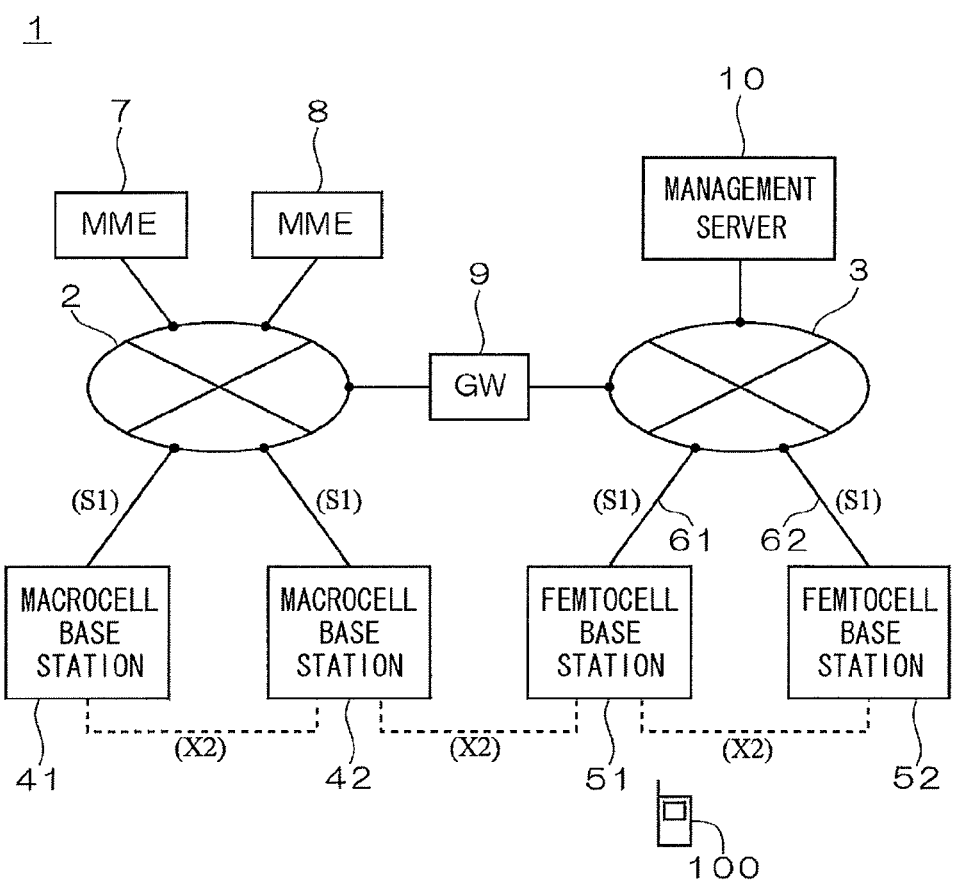
FIG. 3 is a diagram showing an overall configuration of a communication system according to a second embodiment of the present invention.

FIG. 3 is a diagram showing an overall configuration of a communication system 1 according to a second embodiment of the present invention. A management server 10 such as an HLR (Home Location Register) is added to the configurations shown in FIG. 1 and other configurations are the same as those in FIG. 1. The management server 10 is connected to a fixed communication network 3. Note, however, that the management server 10 does not necessarily need to be connected to the fixed communication network 3 and may be installed in any location in the communication system 1. In the management server 10, pieces of location information about the installed locations of existing radio base stations (in the example of the present embodiment, macrocell base stations 41 and 42 and a femtocell base station 52) are stored so as to be associated with pieces of identification information such as base station IDs.

Figure 4:
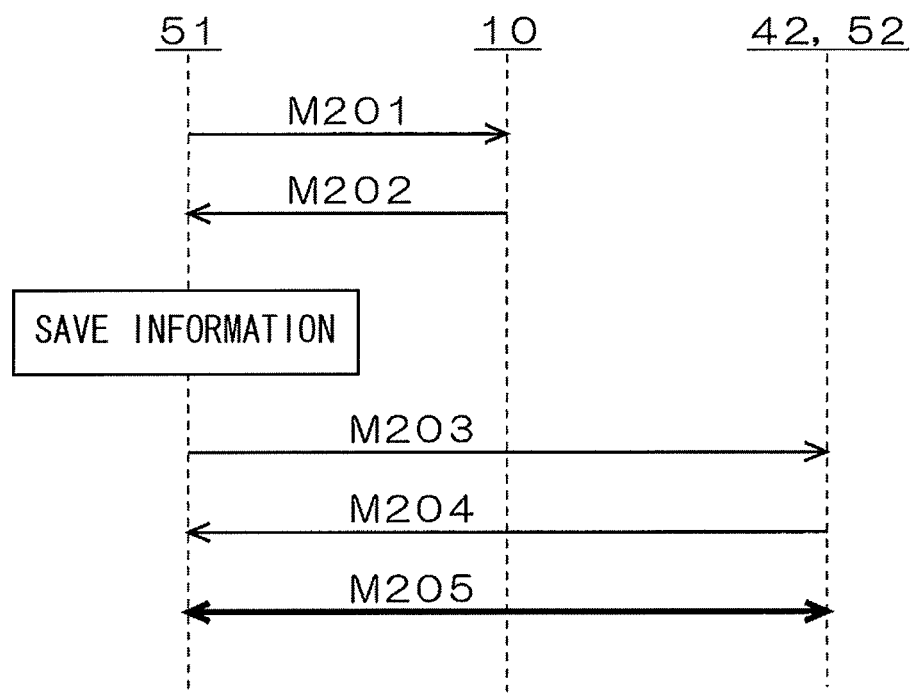
FIG. 4 is a diagram showing a process sequence for establishing communication connections when a femtocell base station is newly installed.

FIG. 4 is a diagram showing a process sequence for establishing communication connections when a femtocell base station 51 is newly installed. When the femtocell base station 51 is connected to the fixed communication network 3, first, the femtocell base station 51 transmits a request signal M201 for requesting self registration, together with identification information thereof such as a base station ID and self location information, to the management server 10 through the fixed communication network 3.

Then, the management server 10 having received the request signal M201 registers the femtocell base station 51 and identifies neighboring base stations of the femtocell base station 51 based on the location information of the femtocell base station 51. In the example of the present embodiment, the management server 10 identifies the macrocell base station 42 and the femtocell base station 52 as the neighboring base stations of the femtocell base station 51. Then, the management server 10 transmits a registration completion notification M202 indicating the completion of registration of the femtocell base station 51, together with information about the identified neighboring base stations, to the femtocell base station 51 through the fixed communication network 3.

Then, the femtocell base station 51 saves the information received from the management server 10 and thereafter transmits a request signal M203 requesting establishment of a communication connection, together with self setting information such as a port number used for an X2 interface and location information, to the macrocell base station 42 and the femtocell base station 52. Transmission of the request signal M203 may be performed by either wire communication or radio communication.

Then, the macrocell base station 42 and the femtocell base station 52 having received the request signals M203 each return a response signal M204 to the request for establishment of a communication connection, together with self setting information such as a port number used for the X2 interface and location information, to the femtocell base station 51. Returning of the response signals M204 may be performed by either wire communication or radio communication.

Then, by the macrocell base station 42 and the femtocell base stations 51 and 52 completing a process for port setting, etc., a communication connection using the X2 interface is established between the femtocell base station 51 and the macrocell base station 42 and between the femtocell base station 51 and the femtocell base station 52. The communication connections may be either wired or radio ones. Thereafter, the femtocell base station 51 and the macrocell base station 42 and the femtocell base station 52 communicate self setting information M205 such as a frequency band to be used, with each other through the communication connections. In addition, when there arises the need for movement operation of a mobile terminal 100, the base stations communicate information about the movement operation with each other through the communication connections.

As such, according to the communication system 1 of the present embodiment, communication connections using a predetermined logical interface are established between the femtocell base station 51 and each of its neighboring base stations (the macrocell base station 42 and the femtocell base station 52). Therefore, since the femtocell base station 51 and its neighboring base stations can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed. In addition, since the femtocell base station 51 and its neighboring base stations can communicate information about movement operation with each other via the logical interface, inter-cell movement can be performed rapidly compared to the case in which the information is communicated via MMEs 7 and 8, etc.

In addition, according to the communication system 1 of the present embodiment, since the femtocell base station 51 and its neighboring base stations can be logically and directly connected to each other using an X2 interface, communication of information can be performed between the femtocell base station 51 and each of its neighboring base stations without adding a change to communication management apparatuses such as the MMEs 7 and 8.

In addition, according to the communication system 1 according to the present embodiment, the femtocell base station 51 obtains information about its neighboring base stations from the management server 10, makes a request to the neighboring base stations, about which the information has been obtained from the management server 10, for establishment of a communication connection, and establishes communication connections with the neighboring base stations having responded to the request. By the management server 10 collectively managing the location information of radio base stations, neighboring base stations of the femtocell base station 51 can be accurately identified based on the location information. In addition, upon requesting establishment of a communication connection, the setting information, etc., of the femtocell base station 51 can be notified from the femtocell base station 51 to its neighboring base stations, and upon responding to the request, the setting information, etc., of the neighboring base stations can be notified from the neighboring base stations to the femtocell base station 51. By the base stations notifying each other of the setting information, communication connections can be securely established.

<Third Embodiment>

Figure 5:
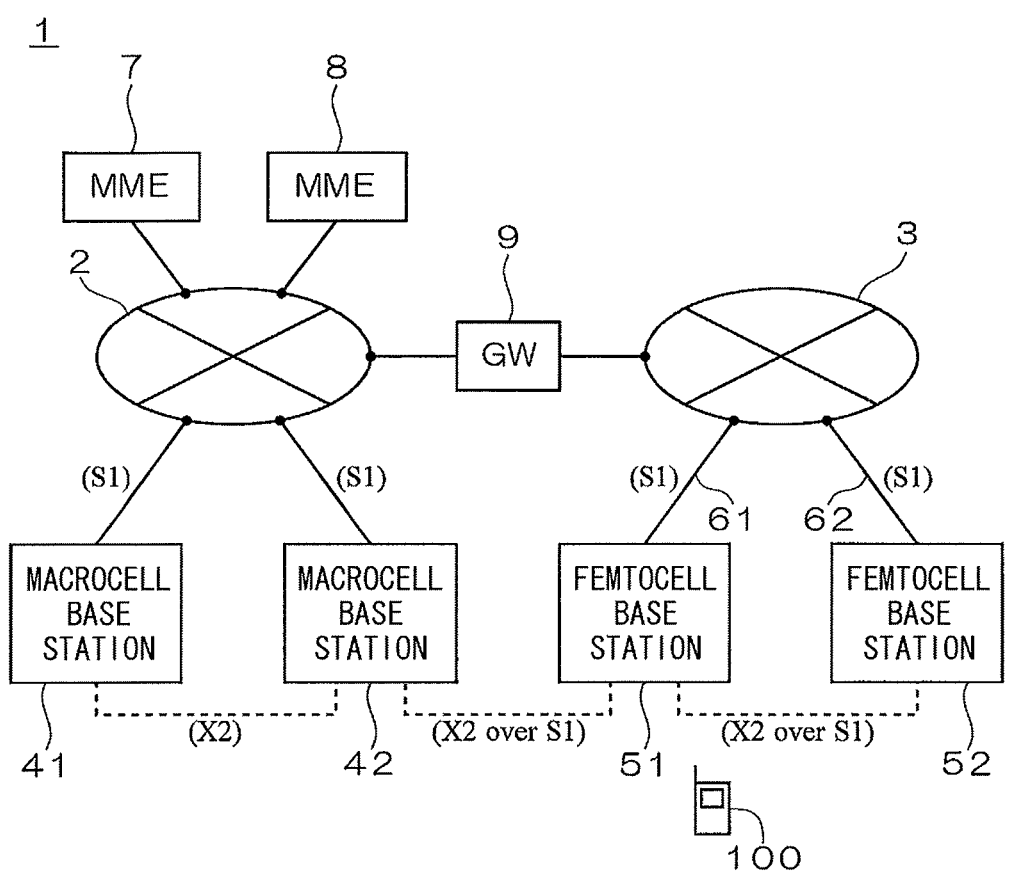
FIG. 5 is a diagram showing an overall configuration of a communication system according to a third embodiment of the present invention.

FIG. 5 is a diagram showing an overall configuration of a communication system 1 according to a third embodiment of the present invention. A femtocell base station 51 is connected to each of a macrocell base station 42 and a femtocell base station 52 which are neighboring base stations, via a base station-to-base station logical interface (X2 interface) tunneled over a base station-to-upper node logical interface (S1 interface). That is, a communication connection using an X2 interface tunneled over an Si interface (hereinafter, referred to as an "X2 over S1 interface") is established between the femtocell base station 51 and each of its neighboring base stations. MMEs 7 and 8 and a gateway 9 can interpret the X2 over S1 interface and thus can appropriately perform routing. Other configurations are the same as those in FIG. 1.

Figure 6:
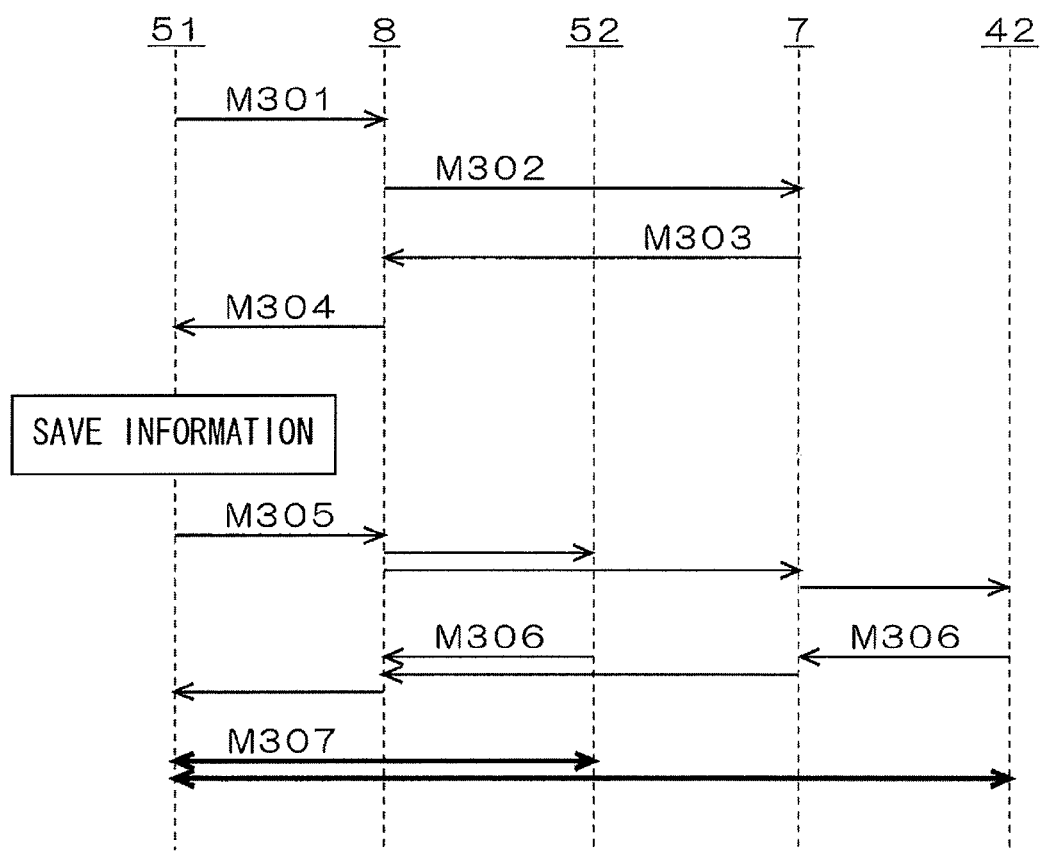
FIG. 6 is a diagram showing a process sequence for establishing communication connections when a femtocell base station is newly installed.

FIG. 6 is a diagram showing a process sequence for establishing communication connections when the femtocell base station 51 is newly installed. When the femtocell base station 51 is connected to the fixed communication network 3, the femtocell base station 51 establishes an S1 interface with the MME 8 and thereafter transmits a request signal M301 for requesting information about its neighboring base stations, together with self location information, to the MME 8 through the fixed communication network 3 and the gateway 9. Note that S1 interfaces between the macrocell base stations 41 and 42 and the MME 7, an S1 interface between the femtocell base station 52 and the MME 8, and an S1 interface (or an S10 interface) between the MME 7 and the MME 8 are already established. Note also that the MME 8 holds information about the MME 7 located in its neighborhood.

Then, the MME 8 having received the request signal M301 collects information about a neighboring base station of the femtocell base station 51, based on the location information of the femtocell base station 51. In the example of the present embodiment, the MME 8 identifies the femtocell base station 52 as a neighboring base station of the femtocell base station 51. In addition, the MME 8 transmits to the MME 7 a request signal M302 for requesting information about a neighboring base station of the femtocell base station 51, together with the location information of the femtocell base station 51. The MME 7 having received the request signal M302 collects information about a neighboring base station of the femtocell base station 51, based on the location information of the femtocell base station 51. In the example of the present embodiment, the MME 7 identifies the macrocell base station 42 as a neighboring base station of the femtocell base station 51. Then, the MME 7 returns a response signal M303 including information about the macrocell base station 42 identified as a neighboring base station, to the MME 8.

The MME 8 having received the response signal M303 returns a response signal M304 including information about the macrocell base station 42 and the femtocell base station 52 identified as neighboring base stations, to the femtocell base station 51 through the gateway 9 and the fixed communication network 3.

Then, the femtocell base station 51 saves the information received from the MME 8 and thereafter transmits a request signal M305 requesting establishment of a communication connection to the femtocell base station 52 through the MME 8, and to the macrocell base station 42 through the MMEs 8 and 7. The request signal M305 includes the setting information of the femtocell base station 51 such as a port number used for the S1 interface and location information.

Then, the macrocell base station 42 having received the request signal M305 returns a response signal M306 to the request for establishment of a communication connection, to the femtocell base station 51 through the MMEs 8 and 7. The response signal M306 includes the setting information of the macrocell base station 42 such as a port number used for the S1 interface and location information. Likewise, the femtocell base station 52 having received the request signal M305 returns a response signal M306 to the request for establishment of a communication connection, to the femtocell base station 51 through the MME 8.

Then, by the macrocell base station 42 and the femtocell base stations 51 and 52 completing a process for port setting, etc., a communication connection using the X2 over S1 interface is established between the femtocell base station 51 and the macrocell base station 42 and between the femtocell base station 51 and the femtocell base station 52. Thereafter, the femtocell base station 51 and the macrocell base station 42 and the femtocell base station 52 communicate self setting information M307 such as a frequency band to be used, with each other through the communication connections. In addition, when there arises the need for movement operation of the mobile terminal 100, the base stations communicate information about the movement operation with each other through the communication connections.

As such, according to the communication system 1 of the present embodiment, communication connections using a predetermined logical interface are established between the femtocell base station 51 and each of its neighboring base stations (the macrocell base station 42 and the femtocell base station 52). Therefore, since the femtocell base station 51 and its neighboring base stations can communicate information about a used frequency band with each other via the logical interface, by setting used frequency bands such that they do not overlap with each other, overlapping of used frequency bands between adjacent cells can be avoided. As a result, radio wave interference between adjacent cells can be suppressed.

In addition, according to the communication system 1 according to the present embodiment, by allowing the X2 interface to be tunneled over the S1 interface, the femtocell base station 51 and its neighboring base stations can be logically connected to each other. As a result, without adding a new port for establishing the X2 interface besides the S1 interface, the femtocell base station 51 and its neighboring base stations can be logically connected to each other.

In addition, according to the communication system 1 according to the present embodiment, information about a neighboring base station of the femtocell base station 51 can be collected from the MME 7 by the MME 8. By the MMEs 7 and 8 collecting information about neighboring base stations, there is no need to prepare a management server 10 (see FIG. 3) holding the location information of radio base stations, making it possible to achieve simplification of the configuration of the communication system 1.

In addition, according to the communication system 1 of the present embodiment, upon requesting establishment of a communication connection, the setting information, etc., of the femtocell base station 51 can be notified from the femtocell base station 51 to its neighboring base stations, and upon responding to the request, the setting information, etc., of the neighboring base stations can be notified from the neighboring base stations to the femtocell base station 51. By the base stations notifying each other of the setting information, communication connections can be securely established.

<Fourth Embodiment>

Figure 7:
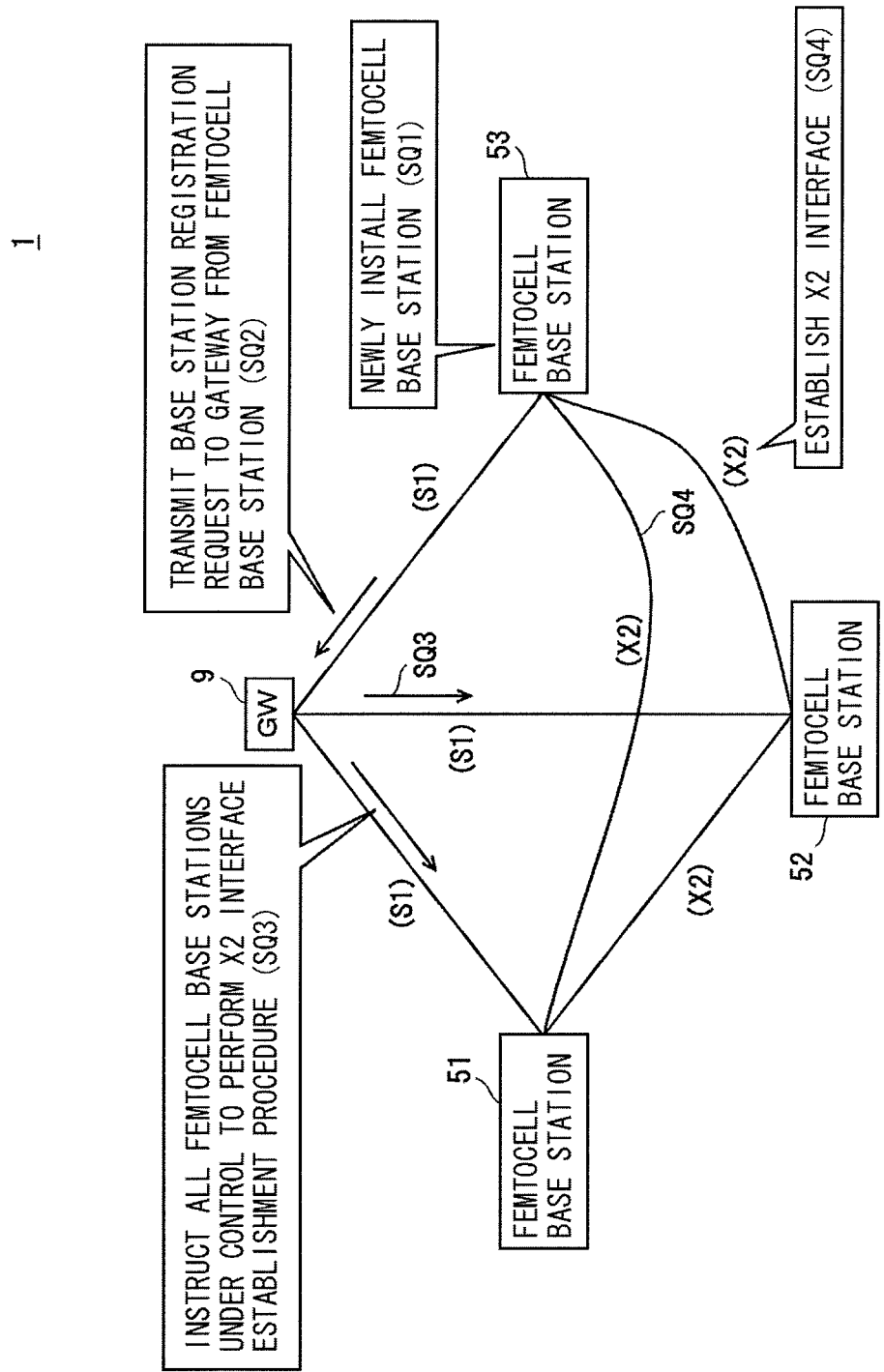
FIG. 7 is a diagram showing a procedure of a process of establishing a communication connection using an X2 interface in a communication system 1 according to a fourth embodiment of the present invention.

FIG. 7 is a diagram showing a procedure of a process of establishing a communication connection using an X2 interface in a communication system 1 according to a fourth embodiment of the present invention.

Referring to FIG. 7, in the communication system 1, a gateway (communication control apparatus) 9 and femtocell base stations 51 and 52 are installed. A femtocell base station 53 is a femtocell base station to be newly installed.

As with a communication system 1 shown in FIG. 1, the femtocell base stations 51, 52, and 53 are connected to a mobile communication network 2 through a fixed communication network 3.

The femtocell base stations 51, 52, and 53 can communicate with a mobile terminal by radio communication and can establish a communication connection using an X2 interface with another femtocell base station.

The gateway 9 can store various information of the femtocell base stations 51, 52, and 53 and can communicate with the femtocell base stations 51, 52, and 53. In addition, the gateway 9 performs control to establish a communication connection using an X2 interface between the femtocell base stations.

For example, information for performing, by a mobile terminal, movement operation between femtocell base stations is transmitted and received between the femtocell base stations via an X2 interface.

For example, this information is an ID for identifying, by the X2 interface, the mobile terminal, a UE Context, etc. The UE Context is basic information of the mobile terminal such as an UE ID, UE (mobile terminal)-to-base station state information indicating an idle state or a connected state, and security information. The security information is security information between the mobile terminal and a base station and between the base station and a network, and information such as an algorithm and a security key that are used for security.

In addition, information indicating interference received by each femtocell base station is transmitted and received between femtocell base stations via the X2 interface.

This interference information is, for example, in LTE, interference information in connection with a time axis direction, specifically, information indicating which one of a plurality of time slots in a radio frame transmitted from the femtocell base station to the mobile terminal suffers from interference.

In addition, the interference information transmitted and received using the X2 interface is interference information in connection with a frequency axis direction, together with or separately from the interference information in connection with the time axis direction. Specifically, the interference information is information indicating which one of a plurality of subcarriers of a radio signal transmitted from the femtocell base station to the mobile terminal suffers from interference.

In addition, load information of each femtocell base station is transmitted and received between femtocell base stations via the X2 interface.

Here, a communication connection using an X2 interface is established between the femtocell base station 51 and the femtocell base station 52.

Note that data compliant with the X2 interface is physically transmitted and received between femtocell base stations through, for example, the gateway 9 or other apparatuses.

When the gateway 9 recognizes a femtocell base station (hereinafter, also referred to as a target base station) to newly establish a communication connection using an X2 interface with another femtocell base station, the gateway 9 notifies this another femtocell base station of a connection establishment instruction indicating an instruction to perform a connection establishment process for establishing a communication connection using the X2 interface with the target base station.

Furthermore, in the communication system 1, the gateway 9 simultaneously instructs all femtocell base stations under control thereof to perform X2 interface establishment.

Namely, the gateway 9 notifies all femtocell base stations under control thereof, i.e., all those femtocell base stations other than the target base station, of a connection establishment instruction.

Specifically, first, when the femtocell base station 53 is newly installed (step SQ1), the femtocell base station 53 transmits a base station registration request to the gateway 9. The base station registration request includes identification information unique to the femtocell base station, e.g., a Cell Global ID, in order for the gateway 9 to identify the femtocell base station. Alternatively, a USIM (Universal Subscriber Identity Module) card may be installed on the femtocell base station and an IMSI (International Mobile Subscriber Identity) saved in the USIM card may be included in the base station registration request (step SQ2).

Then, when the gateway 9 receives the base station registration request from the femtocell base station 53 and thereby recognizes that the femtocell base station 53 has been newly installed, the gateway 9 simultaneously notifies, for example, all femtocell base stations under control thereof, here, the femtocell base station 51 and the femtocell base station 52, of a connection establishment instruction indicating an instruction to perform an X2 interface establishment procedure (step SQ3). The X2 interface establishment procedure is, for example, a procedure obtained by changing a procedure such as that shown in FIG. 2 such that the existing femtocell base stations transmit a request signal requesting establishment of a communication connection, etc., to the newly installed femtocell base station.

Then, in response to the connection establishment instruction from the gateway 9, the femtocell base station 51 and the femtocell base station 52 each perform an X2 interface establishment procedure with the femtocell base station 53 in order to establish a communication connection using an X2 interface with the newly installed femtocell base station 53 (step SQ4).

Figure 8:
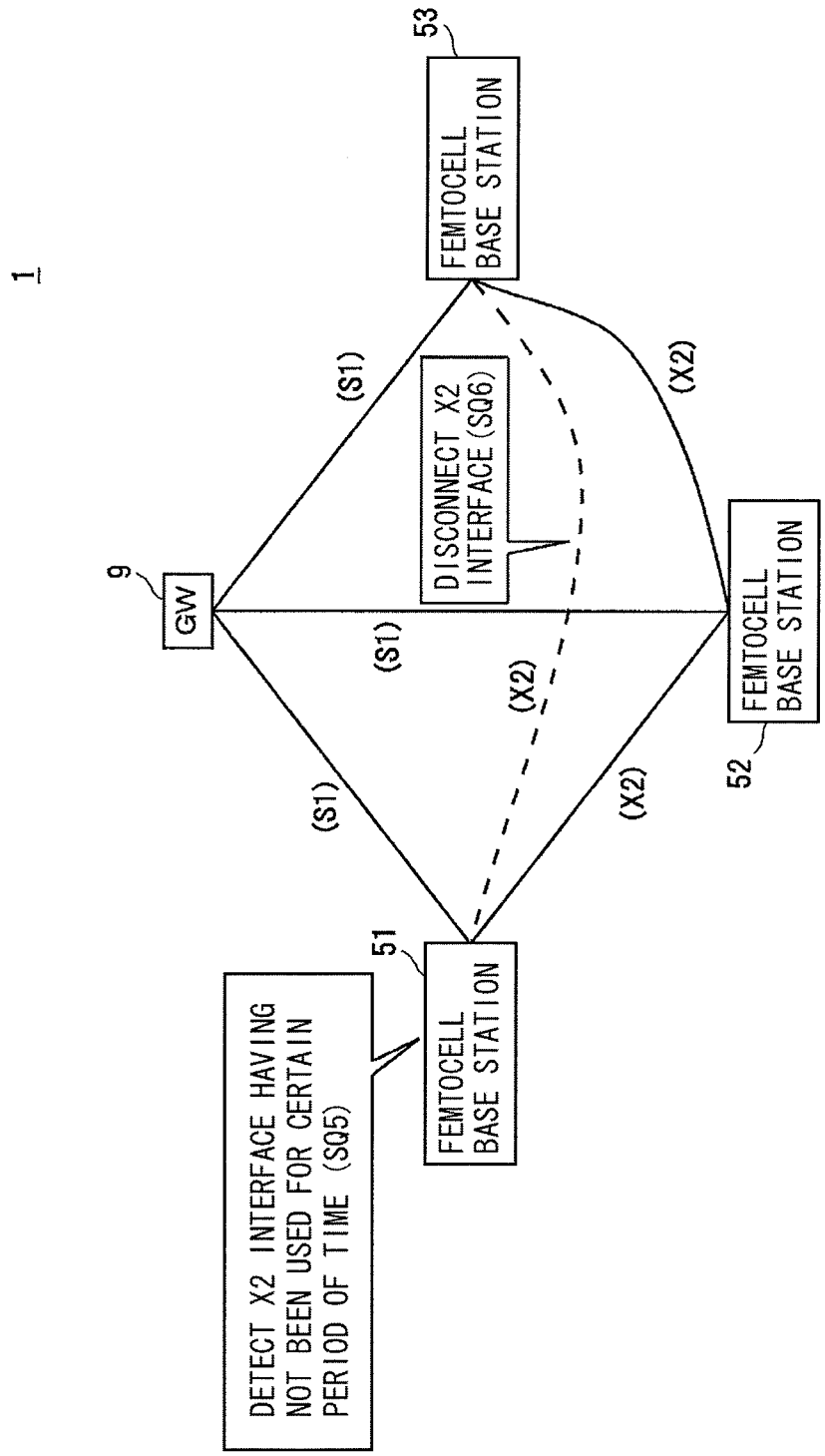
FIG. 8 is a diagram showing a procedure of a process of disconnecting a communication connection using an X2 interface in the communication system 1 according to the fourth embodiment of the present invention.

FIG. 8 is a diagram showing a procedure of a process of disconnecting a communication connection using an X2 interface in the communication system 1 according to the fourth embodiment of the present invention.

Referring to FIG. 8, after the femtocell base stations 51 and 52 are notified of a connection establishment instruction from the gateway 9 and thereby perform a connection establishment process, the femtocell base stations 51 and 52 each determine whether or not to maintain an establishment state of a communication connection using an X2 interface with the femtocell base station 53. Then, if the femtocell base stations 51 and 52 determine not to maintain the establishment states of their respective communication connections, then the femtocell base stations 51 and 52 disconnect their respective communication connections.

Specifically, when the femtocell base station 51 and the femtocell base station 52 each establish a communication connection using an X2 interface with the newly installed femtocell base station 53 (step SQ4), the femtocell base station 51 and the femtocell base station 52 each monitor whether or not the X2 interface with the femtocell base station 53 is used, e.g., whether or not predetermined data compliant with the X2 interface is periodically transmitted and received between the femtocell base station and the femtocell base station 53.

Then, if the femtocell base station 51 and the femtocell base station 52 each detect that the X2 interface with the femtocell base station 53 has not been used for a certain period of time (step SQ5), then the femtocell base station 51 and the femtocell base station 52 each disconnect the communication connection using the X2 interface with the femtocell base station 53 (step SQ6).

As described previously, in the communication system 1 according to the fourth embodiment of the present invention, performance of an X2 interface establishment procedure is instructed to each femtocell base station by a simultaneous notification. Hence, it is considered that a communication connection using an X2 interface may be established even between femtocell base stations that are not adjacent to each other.

Hence, in the communication system 1, when, after establishment of a communication connection using an X2 interface, for example, it is detected that femtocell base stations have not used the X2 interface for a certain period of time, the communication connection is disconnected. This can suppress a waste of resources such as the throughput of a CPU (Central Processing Unit), etc., and the amount of memory in the femtocell base stations.

Note that as the case in which an X2 interface between a given femtocell base station and another femtocell base station is not used, for example, the case is considered in which movement operation of a mobile terminal is not performed between the femtocell base stations for the reason, for example, that the installed locations of the femtocell base stations are away from each other or there is a shield between the femtocell base stations.

Meanwhile, when a femtocell base station is newly installed, a communication connection using an X2 interface is established between the newly installed femtocell base station and another femtocell base station. Manual performance of an X2 interface establishment procedure by a human to establish this communication connection not only has poor efficiency but also incurs cost. In addition, when a communication connection using an X2 interface between a femtocell base station and another femtocell base station is disconnected due to, for example, power-off of the femtocell base station, too, the efficiency is poor and it takes cost.

Here, for a method of establishing a communication connection between a newly installed femtocell base station and another femtocell base station in the communication system, the adoption of an SON (Self-Organizing Network) as in the case of a communication system according to the first embodiment of the present invention is considered. The SON is a technique in which a femtocell base station automatically adjusts and sets only required parameters in a communication system.

However, in a process of establishing an inter-base station interface using the SON, for example, a femtocell base station or a mobile terminal measures a radio signal transmitted from its neighboring femtocell base station and performs various adjustment and setting processes based on the result of the measurement. Hence, there arises the need to provide femtocell base stations with the function.

On the other hand, in the communication system according to the fourth embodiment of the present invention, when the gateway 9 recognizes a target base station which is a femtocell base station to newly establish a communication connection using an X2 interface with another femtocell base station, the gateway 9 notifies a plurality of femtocell base stations other than the target base station of a connection establishment instruction indicating an instruction to perform a connection establishment process for establishing a communication connection using the X2 interface with the target base station. Then, after each femtocell base station is notified of the connection establishment instruction from the gateway 9 and thereby performs a connection establishment process, each femtocell base station determines whether or not to maintain an establishment state of a communication connection using the X2 interface with the target base station. If determined not to maintain the establishment state, then the femtocell base station disconnects the communication connection using the X2 interface.

By such a configuration, when a femtocell base station is newly installed and a communication connection using an X2 interface is established between the femtocell base station and another femtocell base station, there is no need for a human to manually perform the establishment process and thus time and trouble and cost can be reduced. In addition, there is no need to provide femtocell base stations with the SON function. Furthermore, by disconnecting an X2 interface that does not need to be maintained, wasteful use of various resources can be prevented in the communication system.

The communication system according to the fourth embodiment of the present invention can be considered to be a different approach than a process of establishing an inter-base station interface using the SON. Specifically, in the communication system according to the fourth embodiment of the present invention, assuming that there is a possibility of causing waste, all femtocell base stations that are presumed to need to establish a communication connection using an X2 interface with a newly installed target femtocell base station are allowed to perform an X2 interface establishment procedure and thereafter an unnecessary X2 interface(s) is (are) deleted.

By such a configuration, a process of establishing a communication connection using an inter-base station interface can be performed with a simple process and configuration.

In addition, in the communication system according to the fourth embodiment of the present invention, the gateway 9 notifies all those femtocell base stations other than a target base station that are associated with the stored information, of a connection establishment instruction.

By such a configuration, a process of selecting a femtocell base station serving as the destination of notification of a connection establishment instruction is not necessary, making it possible to achieve simplification of a process of notifying of a connection establishment instruction.

In addition, in the communication system according to the fourth embodiment of the present invention, when, after the femtocell base stations 51, 52 are notified of a connection establishment instruction from the gateway 9 and thereby perform a connection establishment process, an X2 interface established with a target base station has not been used for a predetermined period, the femtocell base stations 51, 52 determine that an establishment state of a communication connection using the X2 interface with the target base station does not need to be maintained.

By such a configuration, whether or not to maintain an X2 interface can be appropriately determined.

In addition, in the communication systems according to the first to fourth embodiments of the present invention, at least one of information for performing, by a mobile terminal, movement operation between femtocell base stations, information indicating interference received by femtocell base stations, and load information of femtocell base stations is transmitted and received between femtocell base stations via a predetermined logical interface.

By such a configuration, radio wave interference between adjacent femtocells is suppressed and rapid and appropriate inter-cell movement can be achieved.

Note that although the communication system according to the fourth embodiment of the present invention is configured such that a communication connection using an X2 interface is established between femtocell base stations, the configuration is not limited thereto. The configuration may be such that a communication connection using an X2 interface is established between a femtocell base station and a macrocell base station or between macrocell base stations. In this case, for example, the MMEs 7 and 8 shown in FIG. 1 serve as communication control apparatuses and notify macrocell base stations and femtocell base stations of a connection establishment instruction.

Note that by a configuration in which a connection establishment instruction and a connection disconnection process are performed for an X2 interface established with a femtocell base station which may be moved or whose power may be turned off due to user's circumstances, advantageous effects such as a reduction in time and trouble and cost and suppression of wasteful use of various resources can be more remarkably obtained.

In addition, although the communication system according to the fourth embodiment of the present invention is configured such that the gateway 9 notifies a plurality of femtocell base stations other than a target base station of a connection establishment instruction, the configuration is not limited thereto. The configuration may be such that the MME 7 or the MME 8 shown in FIG. 1 serves as a communication control apparatus and notifies a connection establishment instruction, or the configuration may be such that a macrocell base station or a femtocell base station serves as a communication control apparatus and notifies of a connection establishment instruction.

In addition, although in the communication system according to the fourth embodiment of the present invention, an X2 interface is being established between existing femtocell base stations other than a femtocell base station to be newly installed, the configuration is not limited thereto. The configuration may be such that among the existing femtocell base stations there is a femtocell base station whose communication connection using an X2 interface with another femtocell base station has not been established and an instruction to establish an X2 interface with a target base station is given also to the femtocell base station.

In addition, although the communication system according to the fourth embodiment of the present invention is configured such that the femtocell base stations 51, 52, by its own determination, disconnect a communication connection using an X2 interface with the femtocell base station 53, the configuration is not limited thereto. The configuration may be such that the femtocell base stations 51, 52 detect that the X2 interface with the femtocell base station 53 has not been used for a certain period of time and reports it to the gateway 9, and the gateway 9 determines that the communication connection using the X2 interface between each of the femtocell base stations 51, 52 and the femtocell base station 53 does not need to be maintained, and thus, controls the femtocell base stations 51, 52 to disconnect the communication connection.

In addition, although the communication system according to the fourth embodiment of the invention is configured such that the gateway 9 recognizes a newly installed femtocell base station as a target base station, and allows a communication connection using an X2 interface to be established between the target base station and another femtocell base station, the configuration is not limited thereto. The configuration may be any as long as the gateway 9 recognizes, as a target base station, a femtocell base station that needs for some reason to establish a communication connection using an X2 interface with another femtocell base station, such as a femtocell base station whose power has been turned off for a long period of time.

In addition, although the communication system according to the fourth embodiment of the invention is configured such that when a femtocell base station detects that an X2 interface with a target base station has not been used for a certain period of time, the femtocell base station disconnects a communication connection using the X2 interface with the target base station, the configuration is not limited thereto. The configuration may be such that when movement operation of a mobile terminal is performed only occasionally between a femtocell base station and a target base station and the amount of data transmitted and received between the femtocell base station and the femtocell base station 53 using an X2 interface during a predetermined period is less than or equal to a predetermined value, the femtocell base station determines that an establishment state of a communication connection using the X2 interface with the target base station does not need to be maintained, and thus disconnects the communication connection.

In addition, when, after a femtocell base station performs a process of establishing a communication connection using an X2 interface with a target base station, the femtocell base station transmits predetermined data to the target base station and the response time of the target base station to the predetermined data is greater than or equal to a predetermined value, the femtocell base station determines that an establishment state of the communication connection does not need to be maintained. For example, after a femtocell base station establishes a communication connection using an X2 interface with a target base station, the femtocell base station transmits a packet to the target base station by a PING (Packet Internet Groper) command and measures response time of the target base station. Then, if the response time is greater than or equal to a predetermined value, then the femtocell base station determines that the necessity for the communication connection is low, and thus disconnects the communication connection.

Other configurations and operations are the same as those of a communication system according to the first embodiment and thus a detailed description is not repeated here.

<Fifth Embodiment>

Figure 9:
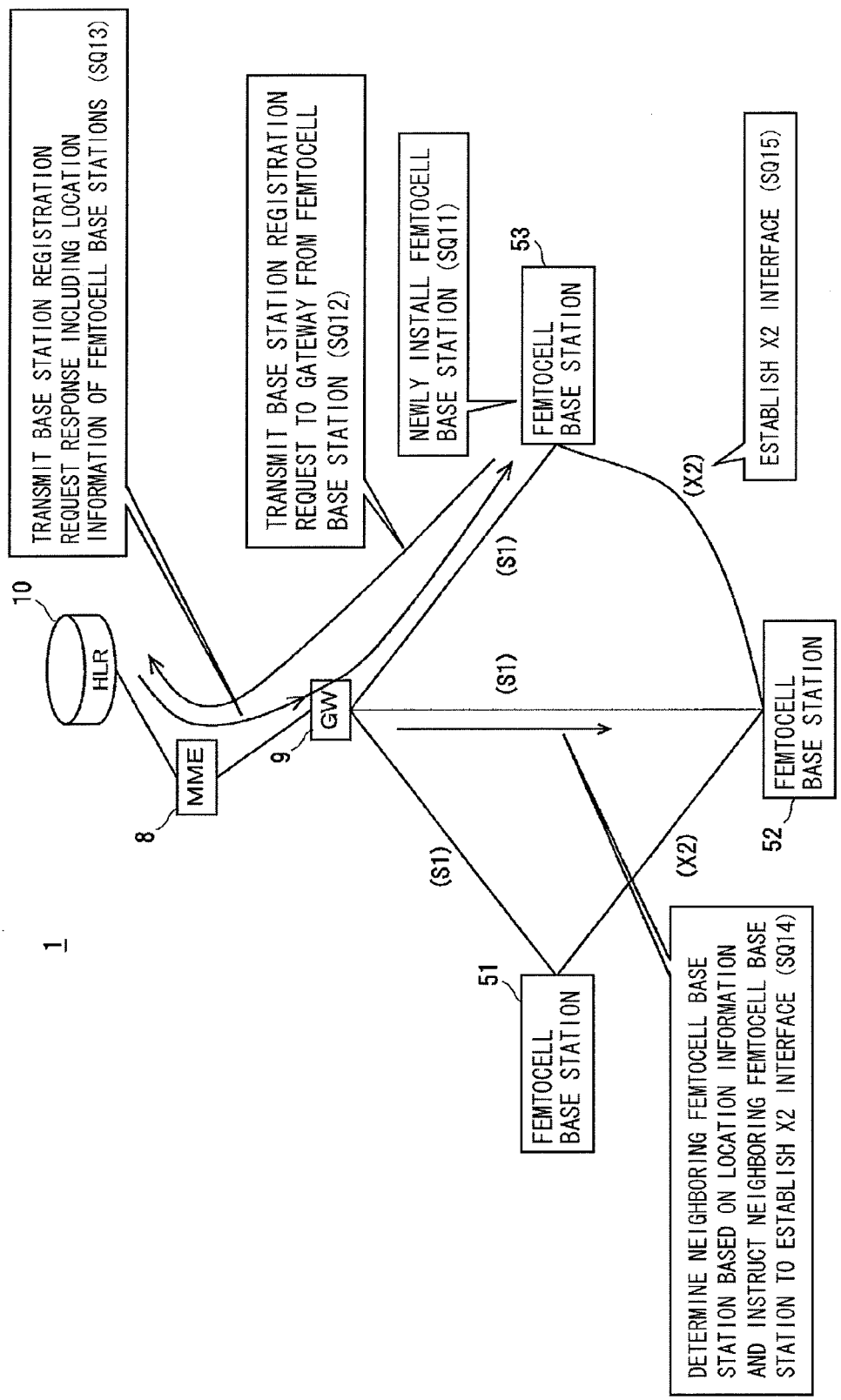
FIG. 9 is a diagram showing a procedure of a process of establishing a communication connection using an X2 interface in a communication system 1 according to a fifth embodiment of the present invention.

FIG. 9 is a diagram showing a procedure of a process of establishing a communication connection using an X2 interface in a communication system 1 according to a fifth embodiment of the present invention.

Referring to FIG. 9, in the communication system 1, a gateway (communication control apparatus) 9, femtocell base stations 51 and 52, an MME 8, and an HLR (communication control apparatus) 10 are installed. The gateway 9 performs control to establish a communication connection using an X2 interface between femtocell base stations. A communication connection using an X2 interface is being established between the femtocell base station 51 and the femtocell base station 52.

The HLR 10 stores information such as location information indicating the installed location of each femtocell base station in the communication system 1, and manages each apparatus in the communication system 1. Here, the location information is, for example, an address requested by a user to a telecommunications carrier as the installed location of a femtocell base station when the user makes a contract with the telecommunications carrier.

In the communication system 1, the gateway 9 instructs a femtocell base station adjacent to a newly installed femtocell base station to establish a communication connection using an X2 interface.

Specifically, when the gateway 9 recognizes a femtocell base station 53 which is a target base station to newly establish a communication connection using an X2 interface with another femtocell base station, the gateway 9 notifies a femtocell base station disposed in the neighborhood of the femtocell base station 53 among all femtocell base stations under control thereof, i.e., those femtocell base stations associated with the stored information, of a connection establishment instruction.

More specifically, the gateway 9 selects a femtocell base station to be notified of a connection establishment instruction from among the femtocell base stations 51 and 52, based on the information indicating the installed locations of the femtocell base stations 51 and 52 and the femtocell base station 53 which is the target base station.

Specifically, first, when the femtocell base station 53 is newly installed (step SQ11), the femtocell base station 53 transmits a base station registration request to the HLR 10 via the gateway 9 and the MME 8 (step SQ12).

Then, the HLR 10 receives the base station registration request from the femtocell base station 53 and outputs a location registration response including the stored location information of the femtocell base stations 51 and 52, to the femtocell base station 53 via the MME 8 and the gateway 9 (step SQ13).

Then, the gateway 9 recognizes, based on the location registration response received from the HLR 10, the new installation of the femtocell base station 53 and the installed locations of the femtocell base stations 51, 52, and 53 and notifies the femtocell base station 52 disposed in the neighborhood of the femtocell base station 53 of a connection establishment instruction indicating an instruction to perform an X2 interface establishment procedure (step SQ14).

Then, in response to the connection establishment instruction from the gateway 9, the femtocell base station 52 performs an X2 interface establishment procedure with the femtocell base station 53 in order to establish a communication connection using an X2 interface with the newly installed femtocell base station 53 (step SQ15).

Then, as with a communication system according to the fourth embodiment of the present invention, when the femtocell base station 52 establishes a communication connection using an X2 interface with the newly installed femtocell base station 53 (step SQ15), the femtocell base station 52 monitors whether or not the X2 interface with the femtocell base station 53 is used, e.g., whether or not predetermined data compliant with the X2 interface is periodically transmitted and received between the femtocell base station 52 and the femtocell base station 53. Then, if the femtocell base station 52 detects that the X2 interface with the femtocell base station 53 has not been used for a certain period of time, then the femtocell base station 52 disconnects the communication connection using the X2 interface with the femtocell base station 53.

As such, in the communication system according to the fifth embodiment of the present invention, when the gateway 9 recognizes a target base station to newly establish a communication connection using an X2 interface with another femtocell base station, the gateway 9 notifies a femtocell base station disposed in the neighborhood of the target base station among those femtocell base stations associated with the stored information, of a connection establishment instruction indicating an instruction to perform a connection establishment process for establishing a communication connection using an X2 interface with the target base station.

By a configuration in which a connection establishment instruction is thus notified only to a femtocell base station disposed in the neighborhood of the target base station, a process of establishing a communication connection using an inter-base station interface can be more efficiently performed.

In addition, in the communication system according to the fifth embodiment of the present invention, the gateway 9 selects, based on information indicating the installed locations of femtocell base stations including a target base station, a femtocell base station to be notified of a connection establishment instruction from among those femtocell base stations associated with the stored information.

By a configuration thus using information indicating the installed locations of femtocell base stations, a femtocell base station to be notified of a connection establishment instruction can be appropriately selected.

Other configurations and operations are the same as those of communication systems according to the second and fourth embodiments and thus a detailed description is not repeated here.

<Sixth Embodiment>

Figure 10:
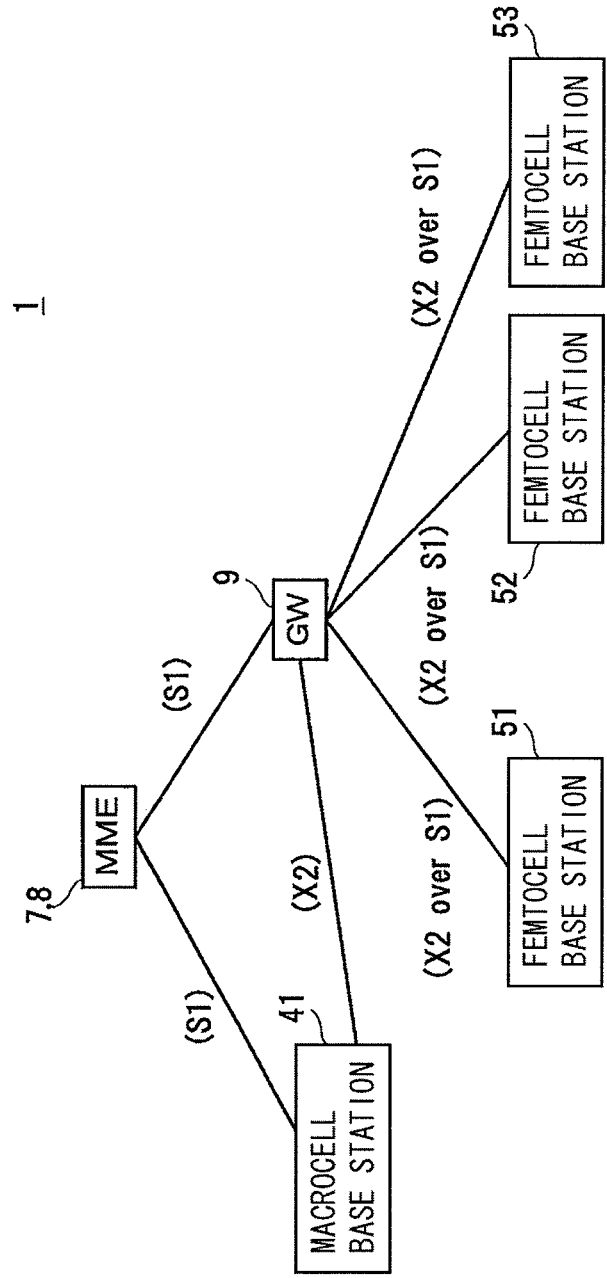
FIG. 10 is a diagram showing a procedure of a process of establishing a communication connection using an X2 interface in a communication system 1 according to a sixth embodiment of the present invention.

FIG. 10 is a diagram showing a procedure of a process of establishing a communication connection using an X2 interface in a communication system 1 according to a sixth embodiment of the present invention.

Referring to FIG. 10, in the communication system 1, a gateway (relay apparatus) 9, femtocell base stations 51, 52, and 53, a macrocell base station 41, and MMEs 7 and 8 are installed.

The installed location of the gateway 9 is the same as that in a communication system 1 shown in FIG. 1. Namely, the gateway 9 is connected between a mobile communication network 2 and a fixed communication network 3. The femtocell base stations 51, 52, and 53 are also connected to the mobile communication network 2 through the fixed communication network 3 and the gateway 9, as with the communication system 1 shown in FIG. 1.

A communication connection using an S1 interface is established between the macrocell base station 41 and the MME 7. In addition, a communication connection using an X2 interface is established between the macrocell base station 41 and the gateway 9.

Here, the gateway 9 looks to the femtocell base stations 51, 52, and 53 as the MME 8 due to communication connections. Namely, the femtocell base stations 51, 52, and 53 perform communication with the upper node side, regarding the gateway 9 as the MME 8. Hence, a communication connection using an S1 interface is established among each of the femtocell base stations 51, 52, and 53, the gateway 9, and the MME 8.

Due to this, when data compliant with the X2 interface is transmitted and received between the macrocell base station 41 and each of the femtocell base stations 51, 52, and 53, the gateway 9 requires a conversion process between the X2 interface and the S1 interface. Thus, there is a possibility that, for the throughput of the communication system 1, an advantageous effect brought about by setting up the X2 interface between the macrocell base station 41 and the gateway 9 may be reduced by half.

Meanwhile, a configuration may be considered in which a communication connection using an X2 interface is established between each of the femtocell base stations 51, 52, and 53 and the gateway 9; however, the gateway 9 looks to the femtocell base stations 51, 52, and 53 not only as the MME 8 but also as the macrocell base station 41, which makes it difficult for the femtocell base stations 51, 52, and 53 to perform communication with the upper node side.

Hence, in the communication system according to the sixth embodiment of the present invention, when a communication connection using a base station-to-base station logical interface, e.g., an X2 interface, is established between the gateway 9 and the macrocell base station 41, the gateway 9 and the femtocell base stations 51, 52, and 53 use a base station-to-base station logical interface using a base station-to-upper node logical interface, e.g., an S1 interface, between the gateway 9 and each of the femtocell base stations 51, 52, and 53.

More specifically, the gateway 9 receives data compliant with the X2 interface from the macrocell base station 41 and transmits the data to the femtocell base station 51, 52, or 53 using the S1 interface. Specifically, the gateway 9 transmits data compliant with the X2 interface to the femtocell base station 51, 52, or 53 such that the data is included, as a single message, in a predetermined field of a frame defined by the S1 interface.

In addition, the gateway 9 transmits data compliant with the X2 interface received from the femtocell base station 51, 52, or 53 using the S1 interface, to the macrocell base station 41. Specifically, the gateway 9 monitors a header of a frame defined by the S1 interface from the femtocell base station 51, 52, or 53 and when the header indicates that data compliant with the X2 interface is included, the gateway 9 extracts data compliant with the X2 interface from the frame and transmits the data to the macrocell base station 41.

As such, in the communication system according to the sixth embodiment of the present invention, by establishing a communication connection using an X2 over S1 interface between the gateway 9 and each of the femtocell base stations 51, 52, and 53, the communication system can be configured as if a communication connection using an X2 interface is established between the macrocell base station 41 and each of the femtocell base stations 51, 52, and 53.

Namely, for communication connections among the macrocell base station 41, the gateway 9, and each of the femtocell base stations 51, 52, and 53, while a communication connection between the macrocell base station 41 and the gateway 9 uses an X2 interface, a communication connection between the gateway 9 and each of the femtocell base stations 51, 52, and 53 uses an X2 over S1. By this, a communication connection using an X2 interface can be established in a pseudo-manner among the macrocell base station 41, the gateway 9, and each of the femtocell base stations 51, 52, and 53.

Other configurations and operations are the same as those of communication systems according to the third and fourth embodiments and thus a detailed description is not repeated here.

The above-described embodiments are to be considered in all respects as illustrative and not restrictive. The scope of the present invention is indicated by the appended claims rather than by the foregoing meanings, and all changes that come within the meanings and range of equivalency of the claims are therefore intended to be embraced therein.

Reference Signs List
- 1: COMMUNICATION SYSTEM
- 2: MOBILE COMMUNICATION NETWORK
- 3: FIXED COMMUNICATION NETWORK
- 7 and 8: MME
- 9: GATEWAY
- 10: MANAGEMENT SERVER and HLR
- 41 and 42: MACROCELL BASE STATION
- 51, 52, and 53: FEMTOCELL BASE STATION
- 61 and 62: WIRE COMMUNICATION LINE
- 100: MOBILE TERMINAL

The invention claimed is:

1. A communication system comprising:
a mobile communication network;
a fixed communication network connected to the mobile communication network; and
a plurality of radio base stations capable of communicating with a mobile terminal by radio communication, wherein
the radio base stations include:
a first base station connected to the mobile communication network, the first base station being a macrocell base station; and
second base stations connected to the fixed communication network through wire communication lines, the second base stations being femtocell base stations;
a communication connection using a base station-to-base station logical interface is established between one of the second base stations and a neighboring base station located in a neighborhood of the one of the second base stations, the neighboring base station including the first base station and/or another one of the second base stations, wherein the base station-to-base station logical interface is a same logical interface as a base station-to-base station logical interface used by macrocell base stations to communicate with each other; and
a relay apparatus connected between the mobile communication network and the fixed communication network,
wherein the second base stations are connected to the mobile communication network through the fixed communication network and the relay apparatus, and
wherein, when a communication connection using the base station-to-base station logical interface is established between the relay apparatus and the first base station, the relay apparatus and the second base stations use the base station-to-base station logical interface using a base station-to-upper node logical interface, between the relay apparatus and the second base stations by including a data of the base station-to-base station logical interface in a frame of the base station-to-upper node logical interface.

2. The communication system according to claim 1, wherein
each of the second base stations:
makes a search for the neighboring base station;
makes a request to a neighboring base station having responded to the search, for establishment of the communication connection; and
establishes the communication connection with the neighboring base station having responded to the request.

3. A communication system comprising:
a mobile communication network;
a fixed communication network connected to the mobile communication network;
a plurality of radio base stations capable of communicating with a mobile terminal by radio communication; and
a management server holding location information of the radio base stations, wherein
the radio base stations include:
a first base station connected to the mobile communication network; and
second base stations connected to the fixed communication network through wire communication lines,
a communication connection using a base station-to-base station logical interface is established between one of the second base stations and a neighboring base station located in a neighborhood of the one of the second base stations, the neighboring base station including the first base station and/or another one of the second base stations, and wherein:
each of the second base stations:
obtains information about the neighboring base station from the management server;
makes a request to the neighboring base station, about which the information is obtained from the management server, for establishment of the communication connection; and
establishes the communication connection with the neighboring base station having responded to the request.

4. A communication system comprising:
a mobile communication network;
a fixed communication network connected to the mobile communication network; and a plurality of radio base stations capable of communicating with a mobile terminal by radio communication, wherein the radio base stations include:

a first base station connected to the mobile communication network; and second base stations connected to the fixed communication network through wire communication lines, and a communication connection using a base station-to-base station logical interface is established between one of the second base stations and a neighboring base station located in a neighborhood of the one of the second base stations, the neighboring base station including the first base station and/or another one of the second base stations, wherein a base station-to-base station logical interface using a base station-to-upper node logical interface is used as the predetermined logical interface, wherein the communication system further comprises a communication management apparatus that is connected to each of the second base stations using the base station-to-upper node logical interface and collects information about the neighboring base station, and wherein each of the second base stations:

obtains information about the neighboring base station from the communication management apparatus;

makes a request through the communication management apparatus to the neighboring base station, about which the information is obtained from the communication management apparatus, for establishment of the communication connection; and establishes the communication connection with the neighboring base station having responded to the request.

5. A compact base station used for a communication system including a mobile communication network; a fixed communication network connected to the mobile communication network; and a plurality of radio base stations capable of communicating with a mobile terminal by radio communication, wherein the radio base stations include:

a first base station connected to the mobile communication network, the first base station being a macrocell base station; and second base stations connected to the fixed communication network through wire communication lines, each of the second base stations serving as the compact base station, the second base stations being femtocell base stations;

a communication connection using a base station-to-base station logical interface is established between one of the second base stations and a neighboring base station located in a neighborhood of the one of the second base stations, the neighboring base station including the first base station and/or another one of the second base stations, wherein the base station-to-base station logical interface is a same logical interface as a base station-to-base station logical interface used by macrocell base stations to communicate with each other; and a relay apparatus connected between the mobile communication network and the fixed communication network, wherein the second base stations are connected to the mobile communication network through the fixed communication network and the relay apparatus, and wherein, when a communication connection using the base station-to-base station logical interface is established between the relay apparatus and the first base station, the relay apparatus and the second base stations use the base station-to-base station logical interface using a base station-to-upper node logical interface, between the relay apparatus and the second base stations by including a data of the base station-to-base station logical interface in a frame of the base station-to-upper node logical interface.

6. A communication method for a communication system including a mobile communication network; a fixed communication network connected to the mobile communication network; and a plurality of radio base stations capable of communicating with a mobile terminal by radio communication, wherein the radio base stations include:

a first base station connected to the mobile communication network, the first base station being a macrocell base station;

second base stations connected to the fixed communication network through wire communication lines, the second base stations being femtocell base stations;

a communication connection using a base station-to-base station logical interface is established between one of the second base stations and a neighboring base station located in a neighborhood of the one of the second base stations, the neighboring base station including the first base station and/or another one of the second base stations, wherein the base station-to-base station logical interface is a same logical interface as a base station-to-base station logical interface used by macrocell base stations to communicate with each other; and a relay apparatus connected between the mobile communication network and the fixed communication network, wherein the one of the second base stations performs communication with the neighboring base station through the communication connection, wherein the second base stations are connected to the mobile communication network through the fixed communication network and the relay apparatus, and wherein, when a communication connection using the base station-to-base station logical interface is established between the relay apparatus and the first base station, the relay apparatus and the second base stations use the base station-to-base station logical interface using a base station-to-upper node logical interface, between the relay apparatus and the second base stations by including a data of the base station-to-base station logical interface in a frame of the base station-to-upper node logical interface.

7. A communication system comprising:

a plurality of radio base stations, each capable of communicating with a mobile terminal by radio communication and capable of establishing a communication connection using a predetermined logical interface with another radio base station; and a communication control apparatus capable of storing information on the plurality of radio base stations and capable of communicating with the plurality of radio base stations, wherein when the communication control apparatus recognizes a target base station being one of the radio base stations to newly establish the communication connection with another one of the radio base stations, the communication control apparatus notifies the plurality of radio base stations other than the target base station of a connection establishment instruction indicating an instruction to perform a connection establishment process for establishing the communication connection with the target base station, and after each of the radio base stations is notified of the connection establishment instruction from the communication control apparatus and thereby performs the connection establishment process, each of the radio base stations determines whether or not to maintain an establishment state of the communication connection with the target base station and if determined not to maintain the establishment state, then the radio base station disconnects the communication connection.

8. The communication system according to claim 7, wherein
the target base station is connected to a mobile communication network through a fixed communication network, and
the communication control apparatus notifies all those radio base stations other than the target base station of the connection establishment instruction.

9. The communication system according to claim 7, wherein
the target base station is connected to a mobile communication network through a fixed communication network, and
the communication control apparatus notifies a radio base station disposed in a neighborhood of the target base station among the radio base stations, of the connection establishment instruction.

10. The communication system according to claim 7, wherein each of the radio base stations determines not to maintain the establishment state of the communication connection when, after the radio base station is notified of the connection establishment instruction from the communication control apparatus and thereby performs the connection establishment process, the predetermined logical interface established with the target base station has not been used for a predetermined period.

11. A communication system comprising:
a plurality of radio base stations, each capable of communicating with a mobile terminal by radio communication and capable of establishing a communication connection using a predetermined logical interface with another radio base station; and
a communication control apparatus capable of storing information on the plurality of radio base stations and capable of communicating with the plurality of radio base stations, wherein
when the communication control apparatus recognizes a target base station being one of the radio base stations to newly establish the communication connection with another one of the radio base stations, the communication control apparatus notifies a radio base station disposed in a neighborhood of the target base station among the radio base stations, of a connection establishment instruction indicating an instruction to perform a connection establishment process for establishing the communication connection with the target base station.

12. The communication system according to claim 9, wherein the communication control apparatus selects the radio base station to be notified of the connection establishment instruction from among the radio base stations, based on information indicating installed locations of the plurality of radio base stations including the target base station.

13. The communication system according to claim 7, wherein at least one of information for performing, by the mobile terminal, movement operation between the radio base stations, information indicating interference received by the radio base stations, and load information of the radio base stations is transmitted and received between the radio base stations via the predetermined logical interface.

14. A communication control apparatus being capable of storing information on a plurality of radio base stations, each capable of establishing a communication connection using a predetermined logical interface with another radio base station, and being capable of communicating with the plurality of radio base stations, wherein
when the communication control apparatus recognizes a target base station being one of the radio base stations to newly establish the communication connection with another one of the radio base stations, the communication control apparatus notifies the plurality of radio base stations other than the target base station of a connection establishment instruction indicating an instruction to perform a connection establishment process for establishing the communication connection with the target base station, and
after each of the radio base stations performs the connection establishment process in response to the connection establishment instruction, the communication control apparatus determines whether or not to maintain an establishment state of the communication connection between each of the radio base stations and the target base station, and if determined not to maintain the establishment state, then the communication control apparatus performs control to disconnect the communication connection.

15. A communication method for a communication system including a plurality of radio base stations, each capable of communicating with a mobile terminal by radio communication and capable of establishing a communication connection using a predetermined logical interface with another radio base station; and a communication control apparatus capable of storing information on the plurality of radio base stations and capable of communicating with the plurality of radio base stations, the communication method comprising the steps of:
when the communication control apparatus recognizes a target base station being one of the radio base stations to newly establish the communication connection with another one of the radio base stations, notifying the plurality of radio base stations other than the target base station of a connection establishment instruction indicating an instruction to perform a connection establishment process for establishing the communication connection with the target base station, and
after each of the radio base stations is notified of the connection establishment instruction from the communication control apparatus and thereby performs the connection establishment process, determining whether or not to maintain an establishment state of the communication connection with the target base station and disconnecting the communication connection if determined not to maintain the establishment state.

16. The communication system according to claim 1, wherein at least one of information for performing, by the mobile terminal, movement operation between the radio base stations, information indicating interference received by the radio base stations, and load information of the radio base stations is transmitted and received between the radio base stations via the base station-to-base station logical interface.

* * * * *